United States Patent [19]
Yoshikawa

[11] Patent Number: 5,551,394
[45] Date of Patent: Sep. 3, 1996

[54] INDUCTION SYSTEM FOR ENGINE

[75] Inventor: Masaaki Yoshikawa, Iwata, Japan

[73] Assignee: Yamaha Hatsudoki Kabushiki Kaisha, Iwata, Japan

[21] Appl. No.: 281,843

[22] Filed: Jul. 28, 1994

[30] Foreign Application Priority Data

Jul. 28, 1993 [JP] Japan .................................. 5-186354

[51] Int. Cl.⁶ .................................................. F02B 15/00
[52] U.S. Cl. ........................................... 123/308; 123/432
[58] Field of Search ...................................... 123/308, 432

[56] References Cited

U.S. PATENT DOCUMENTS

| | | | |
|---|---|---|---|
| 4,667,636 | 5/1987 | Oishi et al. | 123/432 |
| 4,683,855 | 8/1987 | Laimbock | 123/432 |
| 5,060,616 | 10/1991 | Nakagawa et al. | 123/432 |
| 5,119,784 | 6/1992 | Hashimoto et al. | 123/432 |
| 5,203,299 | 4/1993 | Ueda | 123/432 |

FOREIGN PATENT DOCUMENTS

| | | | |
|---|---|---|---|
| 55-32976 | 3/1980 | Japan | 123/432 |
| 61-49120 | 3/1986 | Japan | 123/432 |
| 63-174537 | 11/1988 | Japan . | |
| 1-36920 | 2/1989 | Japan | 123/432 |
| 3-160114 | 7/1991 | Japan | 123/308 |
| 3-202619 | 9/1991 | Japan | 123/432 |
| 3-264727 | 11/1991 | Japan . | |
| 4-81522 | 3/1992 | Japan | 123/308 |

Primary Examiner—David A. Okonsky
Attorney, Agent, or Firm—Knobbe, Martens, Olson & Bear

[57] ABSTRACT

A cylinder head and induction passage arrangement for a three intake valve per cylinder internal combustion engine that provides a compact configuration while at the same time maintaining an induction system that is tuned to provide optimum performance throughout the entire engine speed and load ranges. In addition, the intake passages and associated control valves for them are arranged so as to generate a tumble action in the combustion chamber under low and mid-range performance while permitting maximum charging under high speed, high load conditions. A single fuel injector injects fuel in such a way as to serve at least a pair of the intake passages.

32 Claims, 7 Drawing Sheets

INDUCTION SYSTEM FOR ENGINE

BACKGROUND OF THE INVENTION

This invention relates to an induction system for an internal combustion engine and more particularly to an improved cylinder head and induction passage arrangement for a multiple valve internal combustion engine.

It has been recognized that the performance of engines can be improved by increasing the number of valves serving each cylinder of the engine. Four valve per cylinder engines employing two intake valves per cylinder are now common practice, particularly in the automotive industry. However, it is also acknowledged that greater performance can be obtained through the use of three intake valves per cylinder. However, the use of three intake valves per cylinder does give rise to certain problems in that the flow through the three intake valves can cause interfering relationship within the cylinder under some conditions and can adversely affect performance.

For example, in a normal three input valve engine there are provided a pair of side intake valves that are disposed on opposite sides of a first plane that lies on the cylinder bore axis and which are intersected or lie close to a second plane perpendicular to the first plane and also passing through the cylinder bore axis. A third or center intake valve is disposed on the first plane and is spaced further from the second plane than the pair of side intake valves.

With this type of valve placement, the side intake valves can be disposed so as to generate a tumble action within the cylinder which has been found to promote performance, particularly under low and mid-range performance. This tumble action directs the charge into the cylinder in such a way as to cause a swirl about an axis that extends transversely to the cylinder bore axis and is thus distinguished from more conventional, axial swirl which occurs around the cylinder bore axis.

It has been found, however, that the positioning of the center intake valve creates a reverse tumble action which obscures or reduces the tumble action which is generated by the side intake valves and can under some running conditions deteriorate engine performance.

It is, therefore, a principal object of this invention to provide an improved induction system arrangement for an engine employing three intake valves per cylinder.

It is a further object of this invention to provide a cylinder head and intake passage arrangement for a three intake valve per cylinder engine wherein the effects of tumble in low and mid-ranges can be maintained.

In addition to the desirability of maintaining a tumble action in the cylinder under some running conditions, it is also desirable to employ a control valve for controlling the flow through the various intake valves. By doing this, it is possible to tune some of the intake passages to suit running conditions substantially different than those of the remaining valves. However, in order to do this, it is necessary to provide intake passages of different lengths and with previously proposed multi-valve constructions, this has not been easy to accomplish.

It is, therefore, a still further object of this invention to provide a cylinder head and induction passage arrangement for a multi-valve engine wherein the passages can be configured so as to have substantially different lengths without interfering with each other and while still maintaining a compact construction.

With the use of multi-valves and multiple intake passages to achieve the aforenoted result, it is the practice to provide at least one intake passage that is separate from the remaining intake passages that serve the cylinder. However, total isolation between the intake passages, particularly where one of them is throttled, can give rise to some performance defects in mid-range conditions where at the transition between the flow between only certain of the intake passages and flow between all of the intake passages.

It is, therefore, a still further object of this invention to provide an improved cylinder head and intake passage arrangement for a multiple valve engine that will provide good performance throughout the entire engine speed in low ranges.

SUMMARY OF THE INVENTION

The features of this invention are all adapted to be embodied in a cylinder head and induction passage arrangement for a multi-valve internal combustion engine that is comprised of a cylinder head having a surface facing an associated cylinder bore and forming therewith at least in part a combustion chamber. A pair of side intake valve seats are formed in the cylinder head surface in proximity to the cylinder bore and on opposite sides of a first plane containing the axis of the cylinder bore and substantially on one side of a second plane extending perpendicular to the first plane and also containing the cylinder bore axis. A center intake valve seat is intersected by the first plane and is spaced from the second plane and is also positioned in proximity to the cylinder bore.

In accordance with a first feature of the invention, intake passage means supply a charge to the valve seats and throttle means control the flow through the intake passage means so that the center intake valve seat serves the combustion chamber only at high speed high load conditions.

In accordance with another feature of the invention, three intake passages are formed in the cylinder each of which terminates at a respective one of the valve seats for supplying an air charge to the combustion chamber through the valve seats. The intake passages serving the side valve seats are configured to introduce the charge in a direction toward the other side of the second plane for generating a tumble action in the combustion chamber. The intake passage communicating with the center valve seat is configured to deliver a charge into the combustion chamber in a direction generally parallel to the cylinder bore axis.

In accordance with a further feature of the invention, a pair of first intake passages each terminate at a respective one of the side valve seats for delivering a charge to the combustion chamber. A third intake passage terminates at the center valve seat for delivering a charge to the combustion chamber. At least a portion of the pair of first intake passages extend along opposite sides and are spaced outwardly from the third intake passage and extend transversely across the third intake passage.

In accordance with a still further feature of the invention, three intake passages each extend through the cylinder head from an inlet opening formed in an outer surface and terminate at a respective one of the valve seats. One of the intake passages is separated from the remaining of the intake passages by a wall that extends through the cylinder head. Opening means is formed in the wall and forms the sole communication between the one intake passage and the remaining intake passages.

DETAILED DESCRIPTION OF THE PREFERRED EMBODIMENTS OF THE INVENTION

Figure 1:
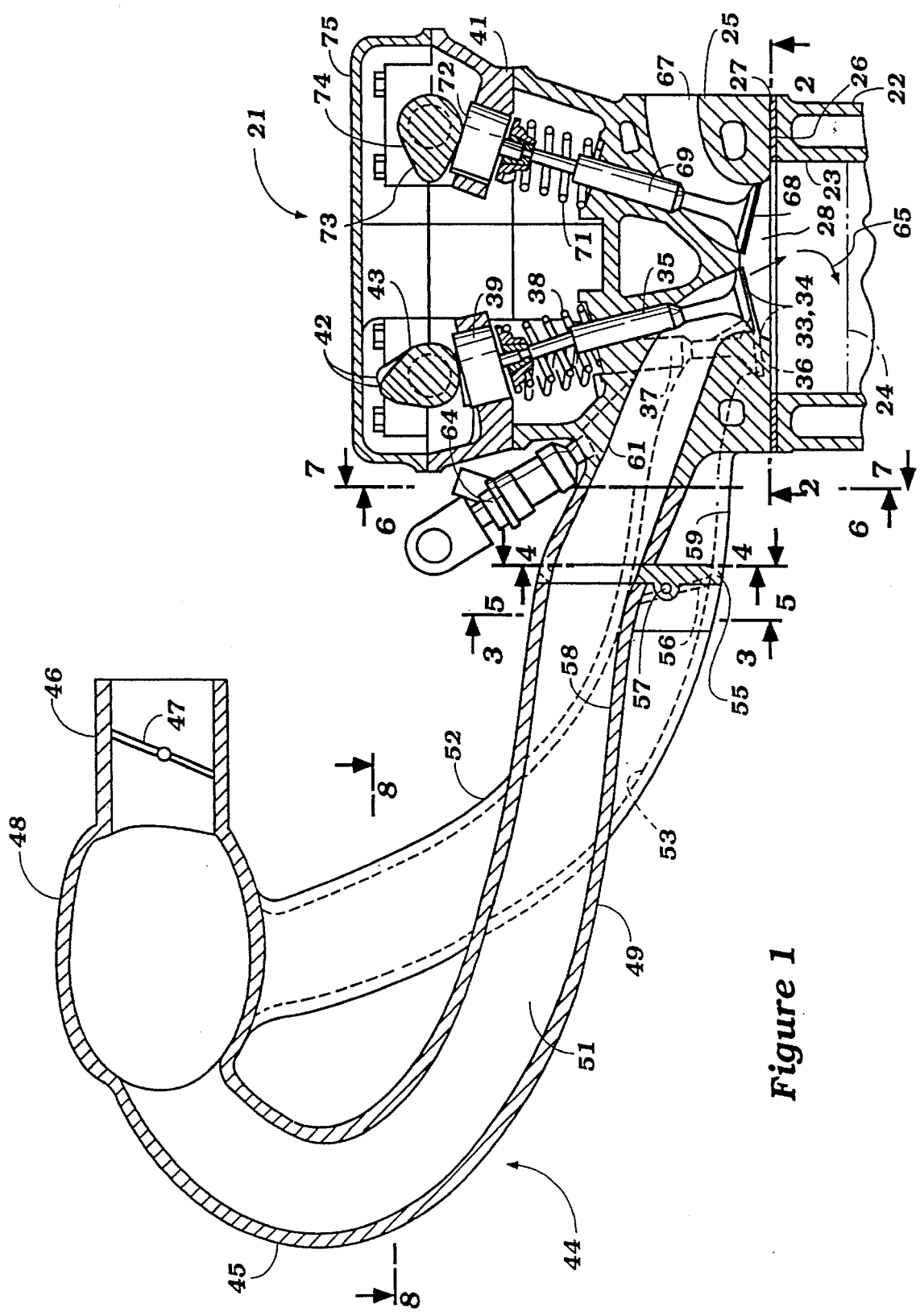
FIG. 1 is a cross-sectional view taken through a single cylinder of a multiple cylinder internal combustion engine constructed in accordance with a first embodiment of the invention.

Referring now in detail to the drawings and initially primarily to FIG. 1, an internal combustion engine having a cylinder head and induction system constructed in accordance with an embodiment of the invention is identified generally by the reference numeral 21. Since the invention deals primarily with the configuration associated with a single cylinder, only one cylinder of the engine has been depicted and it is depicted in cross section in this figure. It is believed from the following description that those skilled in the art will readily understand how the invention can be applied to multiple cylinder engines and engines having any configuration such as in-line engines, as illustrated, or engines having cylinder banks disposed at an angle to each other. Also, since the invention is directed primarily to the combustion chamber, cylinder head and induction system, only the upper portion of the engine is depicted. Again, it will be readily apparent to those skilled in the art how the induction system and cylinder head arrangement can be used with other components of conventional types of engines.

The engine 21 includes a cylinder block 22, which is shown only partially for the reasons aforenoted, and which has one or more cylinder bores 23 in which pistons 24 are supported by reciprocation. The pistons 24 are connected in a known manner to the crankshaft by connecting rods as is conventional in this art.

A cylinder head assembly including a main cylinder head casting 25 is affixed to the cylinder block 22 in any well known manner. The cylinder head 25 has a first surface 26 that extends around the cylinder bore 23 and engages a cylinder head gasket 27 for providing a compression seal. A recessed surface 28 of the cylinder head 25 faces the cylinder bore 23 and defines at least in part the combustion chamber. This combustion chamber is further defined by the cylinder head surface 27, cylinder bore 23, and piston 24 as is well known in this art.

Figure 2:
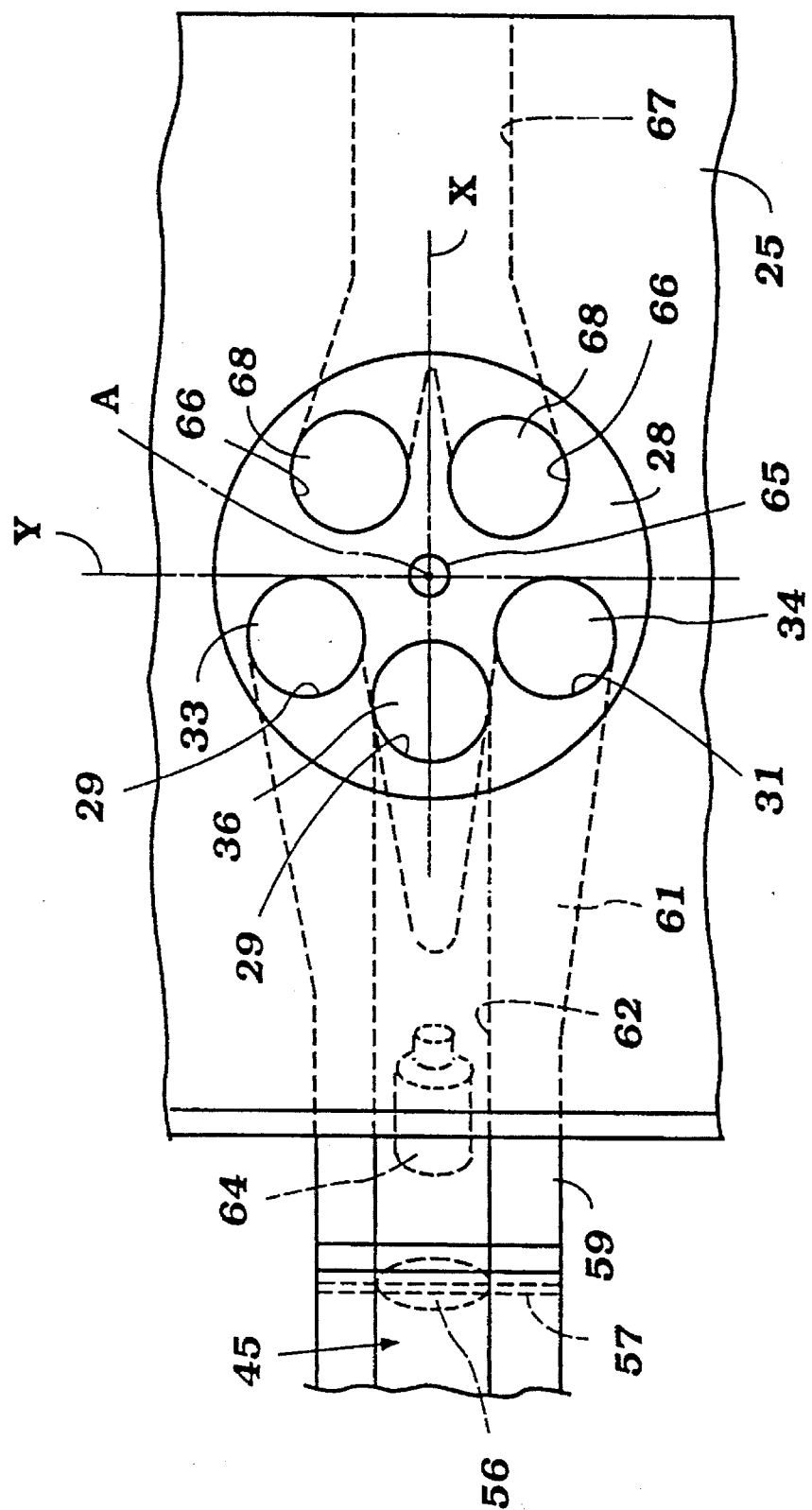
FIG. 2 is a view looking at the underside of the cylinder head and the adjacent portion of the induction system generally in the direction of the line 2—2 in FIG. 1.
Figure 3:
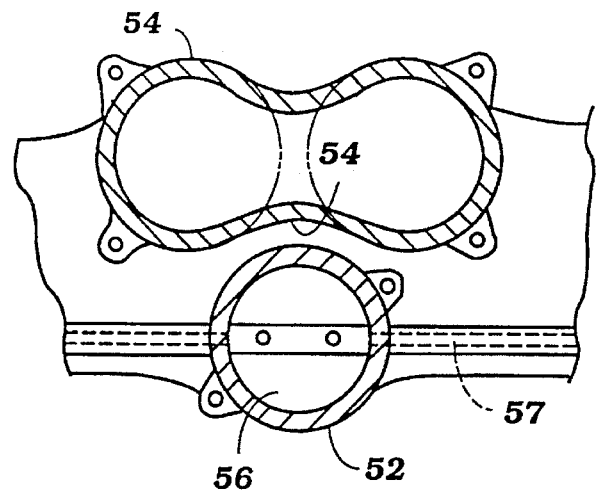
FIG. 3 is a cross-sectional view taken along the line 3—3 of FIG. 1.
Figure 8:
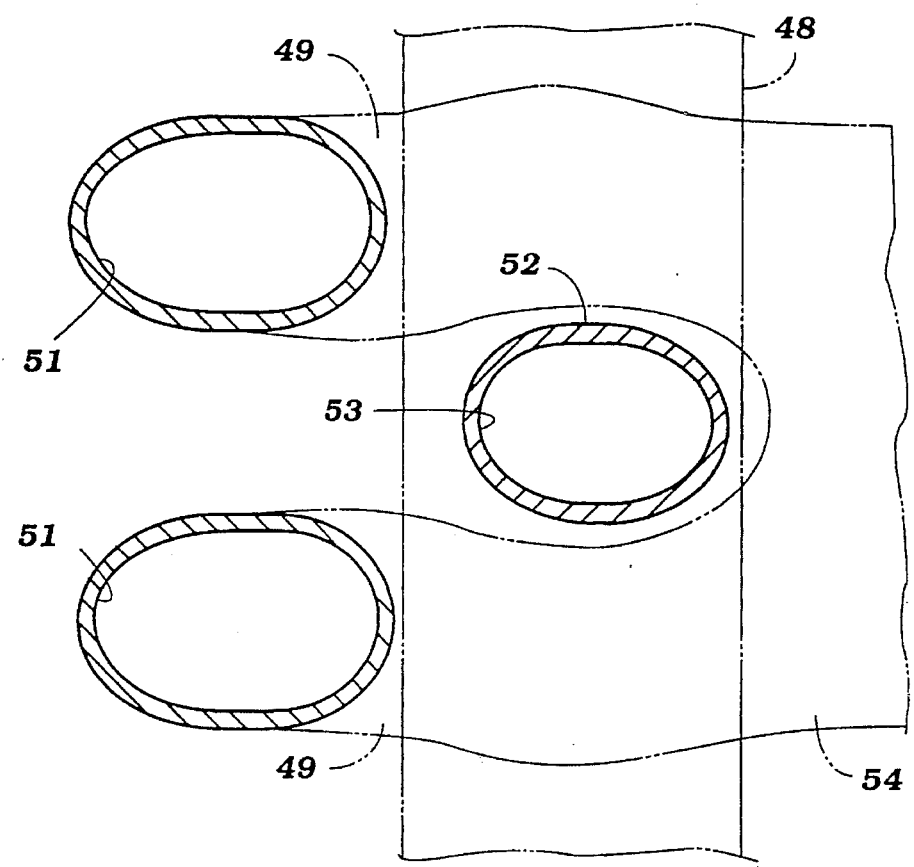
FIG. 8 is a cross-sectional view taken along the line 8—8 of FIG. 1.
Figure 4:
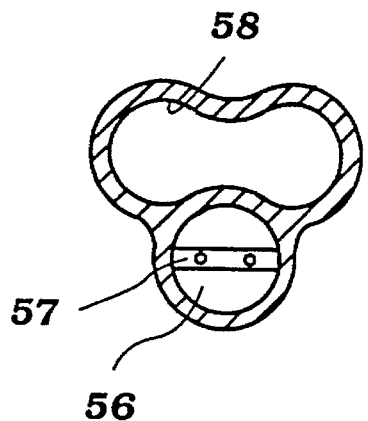
FIG. 4 is a cross-sectional view taken along the line 4—4 of FIG. 1.
Figure 5:
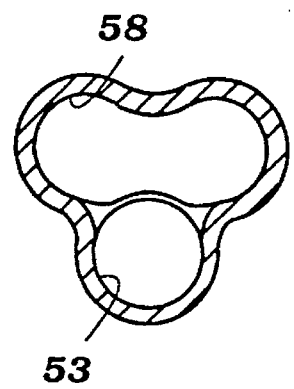
FIG. 5 is a cross-sectional view taken along the line 5—5 of FIG. 1.
Figure 7:
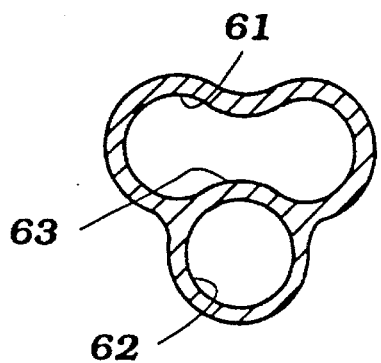
FIG. 7 is a cross-sectional view taken along the line 7—7 of FIG. 1.
Figure 6:
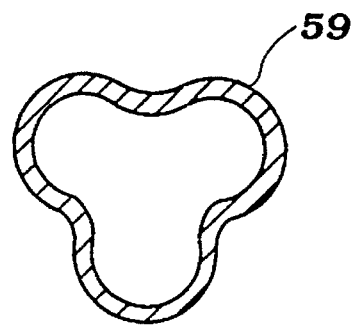
FIG. 6 is a cross-sectional view taken along the line 6—6 of FIG. 1.
Figure 9:
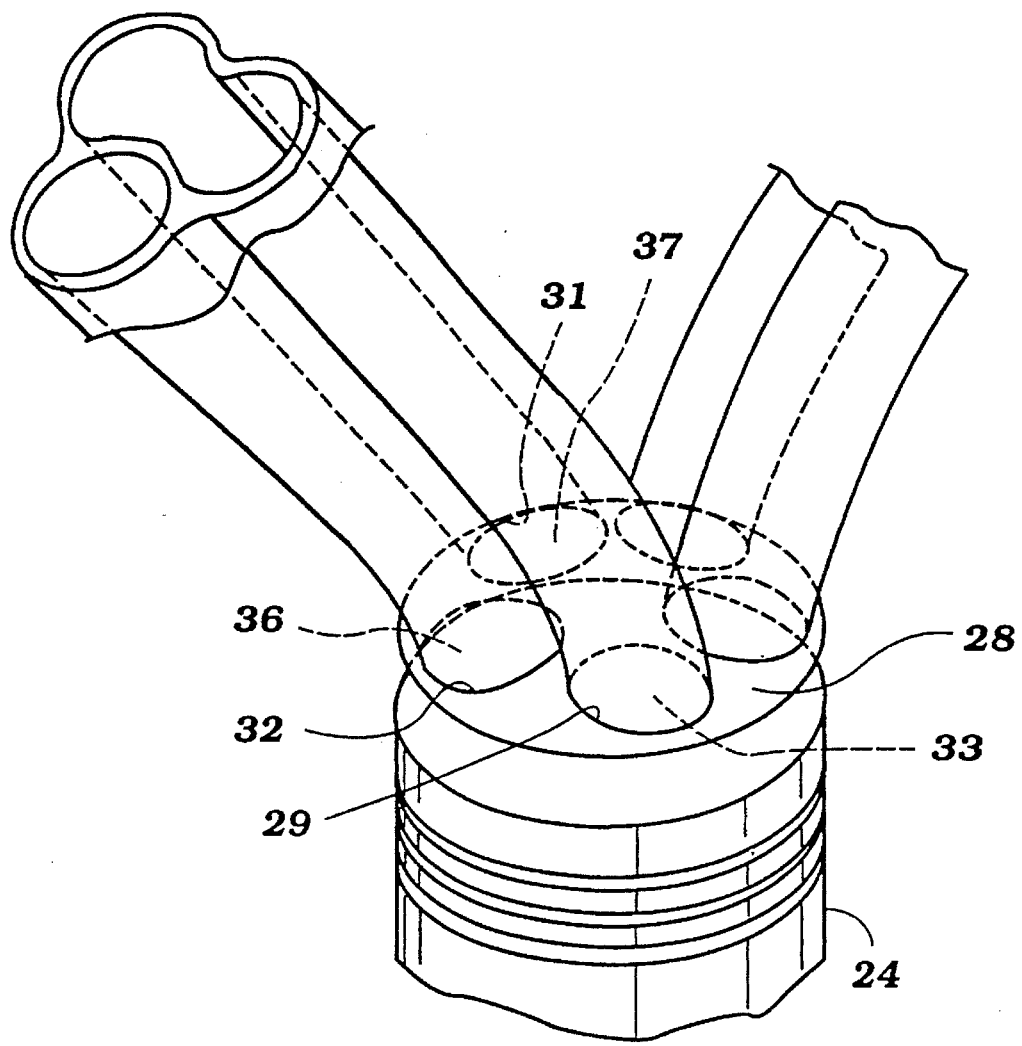
FIG. 9 is a perspective view showing the piston and the induction and exhaust passages formed in the cylinder head.

An induction system, which will be described initially by reference to FIGS. 2 and 9 in addition to FIG. 1 is provided for delivering a fuel air charge to the combustion chamber through the cylinder head recess 28. This induction system is comprised of a pair of side intake valve seats 29 and 31 which are formed in the cylinder head 25 on opposite sides of a first plane X (FIG. 2) that contains the axis A of the cylinder bore and which extends generally perpendicularly to the crankshaft of the engine. These intake valve seats 29 and 31 also lie close to and in fact are intersected by a second plane Y that also contains the cylinder bore axis A and which extends perpendicular to the first plane X as clearly shown in FIG. 2. These valve seats 29 and 31 are also disposed substantially adjacent the outer periphery of the cylinder bore 23.

A third center intake valve seat 32 is disposed on the plane X and at a greater distance from the plane Y than the side intake valve seats 29 and 31. The center intake valve seat 32 is disposed also so that it extends to an area adjacent the periphery of the cylinder bore 23. In the illustrated embodiment, the intake valve seats 29, 31, and 32 all have substantially the same diameter. It is to be understood, however, that the sizes of the valve seats 29, 31, and 32 may be different or two may have the same size and the remaining one may be different. The choice of the respective sizes can be determined to achieve the desired result.

The heads of a pair of side intake valves 33 and 34 cooperate with the valve seats 29 and 31 so as to control the admission of a charge to the combustion chamber recess 28 from the induction system as will be further described later. These intake valves 33 and 34 are slidably supported for respectively reciprocal axes by valve guides 35 that are pressed into the cylinder head 25. These reciprocal axes may, in a preferred embodiment, be disposed so that they lie in a common plane that is disposed at an acute angle to the plane Y.

A third, center intake valve 36 has its head portion cooperating with the center intake valve seat 32 for controlling the flow through it. This intake valve is slidably supported for reciprocation within a valve guide 37 that is fixed in the cylinder head 25 in an appropriate manner. The center intake valve 36 reciprocates about an axis that is disposed at an acute angle to the plane Y and this acute angle is lesser than the acute angles about which the side intake valves 33 and 34 reciprocate. Although this is a preferred relationship, it should be noted that the angular relationship of the valves 33, 34 and 36 may be varied as well as their size, as aforenoted.

Valve springs 38 encircle the stems of each of the intake valves 33, 34, and 36 and act against keeper retainer assemblies and tappets 39 for urging the valves to their closed positions. These tappet bodies 39 are supported in a cam carrier 41 that is affixed to the cylinder head 25 and forms a further portion of the cylinder head assembly. These tappet bodies 41 are operated by the lobes 42 of an intake cam shaft 43 that is also journalled in the cam carrier 41 for opening the valves 33, 34, and 36 in a well known manner. The intake cam shaft 43 is driven by the crankshaft of the engine through an appropriate drive at one half crankshaft speed, as is well known in this art.

The induction system that supplies the charge to the combustion chamber 28 through the respective intake valve seats 29, 31, and 32 will now be described by reference to all figures of this embodiment (FIGS. 1 through 9). This induction system is indicated generally by the reference numeral 44 and includes a combined intake manifold and plenum chamber 45 which has an atmospheric air inlet 46 that draws atmospheric air through an air silencer and cleaner (not shown). A manually operated throttle valve 47 is positioned in the air inlet 46 for controlling the speed of the engine. The air inlet 46 communicates with a plenum chamber 48 which extends along the length of the engine at one side of the cylinder head 25. This is depicted in phantom at FIG. 8.

This plenum chamber is provided with a pair of runners 49 which define a pair of side intake passages 51 which, as seen in FIG. 1, curve outwardly away from the cylinder head 25 and then turn back toward it. In addition, a further runner 52 forms a center or third intake passage 53 which extends downwardly between the runners 49 and which intersects them at an acute angle as shown in FIG. 1. This configuration is chosen so that the intake passages which serve the side intake valve seats 29 and 31 will be longer than the center intake passage 53 that serves the center intake valve seat 32.

As a result of this configuration, it is possible to tune the side intake passages so as to have better charging efficiency under low and mid-range speeds and to tune the center intake passage 53 so as to have better charging efficiency for high speed high load conditions. The configuration permits the accomplishment of this purpose within a relatively small area and thus provides compactness and yet individual tuning. It should be noted that after the side intake runners 49 pass the center runner 42 they merge together and form a siamese section 54.

A valve body 55 is disposed at the outlet end of the manifold runners 49 and 52 and contains a control valve 56 which is journalled on a control valve shaft 57 which is disposed below the runners 49 and hence does not intercept the side intake passages 51. This permits maximum air flow and does not require any sealing of the valve shaft 57 relative to these side passages 51. The siamese portion of the side intake passages 51 which extend through the manifold 45 and the remaining portions is identified by the reference numeral 58 in the drawings for ease of identification.

A relatively short connecting piece 59 forms an extension of the manifold 45 downwardly of the valve body 55 and mates with intake passages 61 and 62 which open through the outer side of the cylinder head 25. The center intake passage 62 is, however, separated from the side intake passage 61 by an internal wall 63 which extends generally to the valve seats 29, 31, and 32.

A fuel injector 64 is mounted in the cylinder head 25 and is positioned so that its spray nozzle discharges into the common portion 58 of the side intake passages. Hence, the fuel distribution will be balanced between the intake passages.

It should be noted that the side intake passages 61 are disposed at an angle to the cylinder head sealing surface 26 and curve toward the valve seats 29 and 31 so as to direct the charge generally across the combustion chamber toward the cylinder wall defined by the bore 23 so as to induce a tumble action to the air flow as indicated by the arrow 65 in FIG. 1. The center intake passage 62 extends more parallel to the cylinder head surface 27 and is generally below the passages 61 and then turns downwardly to the valve seat 32 so as to initiate a flow in substantially axial direction parallel to the cylinder bore axis A. Although this tends to reduce turbulence in the combustion chamber, it can induce some counter tumble to that shown by the arrow 65 which is not desirable at low and mid-range speeds. Because of this, the control valve 56 is maintained in a closed position, through a suitable linkage or vacuum motor actuating system and is only open at high speed, high load so as to supply the adequate air for the engine operation without adversely effecting the flow pattern into the combustion chamber.

A spark plug 65 (FIG. 2) is mounted centrally in the cylinder head 25 with its gap disposed substantially on the axis of the cylinder bore A for firing the charge which has been introduced by the induction system as thus far described.

Referring again primarily to FIGS. 1, 2, and 9, a pair of exhaust valve seats 66 are formed in the cylinder head surface 28 on the side of the plane Y opposite to the intake valve seats. These valve seats 66 communicate with a siamese exhaust passage 67 formed in the cylinder head and which exits the cylinder head through the side opposite the induction system 44. A suitable exhaust manifold and exhaust system (not shown) cooperates with the exhaust passages 67 for discharging exhaust gases to the atmosphere.

A pair of exhaust valves 68 have their head portions adapted to engage the valve seat 66 to control the flow through the exhaust passage 67. These exhaust valves 68 are supported for reciprocation within valve guide 69 pressed into the cylinder head 25. The axes of reciprocation are parallel and lie in a plane that is disposed at an acute angle to the plane Y on the exhaust side of the cylinder head 25. This plane is disposed at an angle between the planes of reciprocation of the intake valves 33 and 34 and 36.

Valve springs 71 are loaded between the stems of the exhaust valve 68 by keeper retainer tappet assembly 72 and the cylinder head 25 for urging the exhaust valve 68 to their closed position.

The exhaust valves 68 are operated by lobes 73 of an exhaust cam shaft 74 that is journalled for rotation in the cam carrier 41 and driven by a suitable timing mechanism along with the intake cam shaft 43. This valve mechanism is enclosed by a cam cover 75 that is fixed to and forms the remaining component of the cylinder head assembly.

Figure 10:
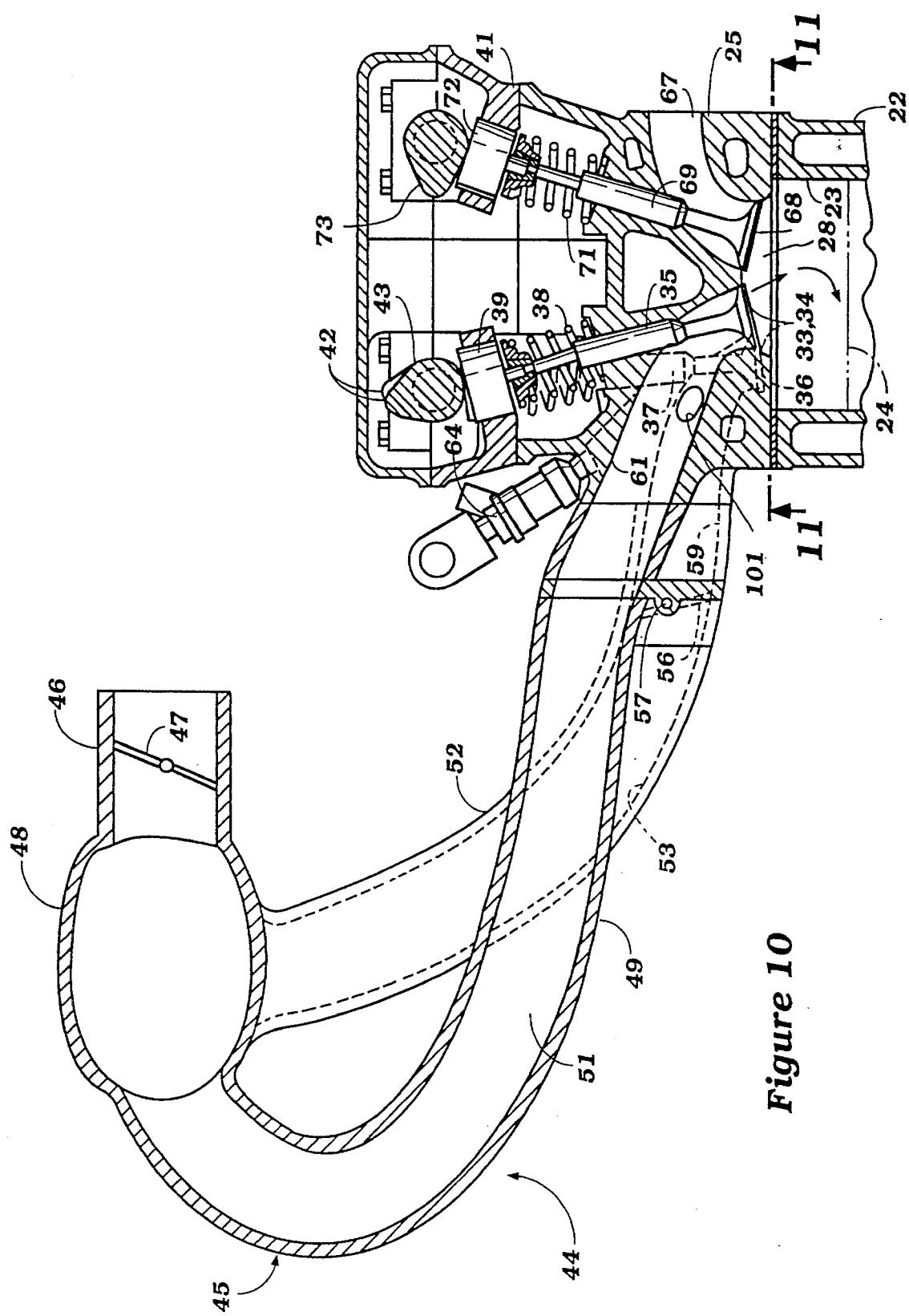
FIG. 10 is a cross-sectional view, in part similar to FIG. 1, and shows another embodiment of the invention.
Figure 11:
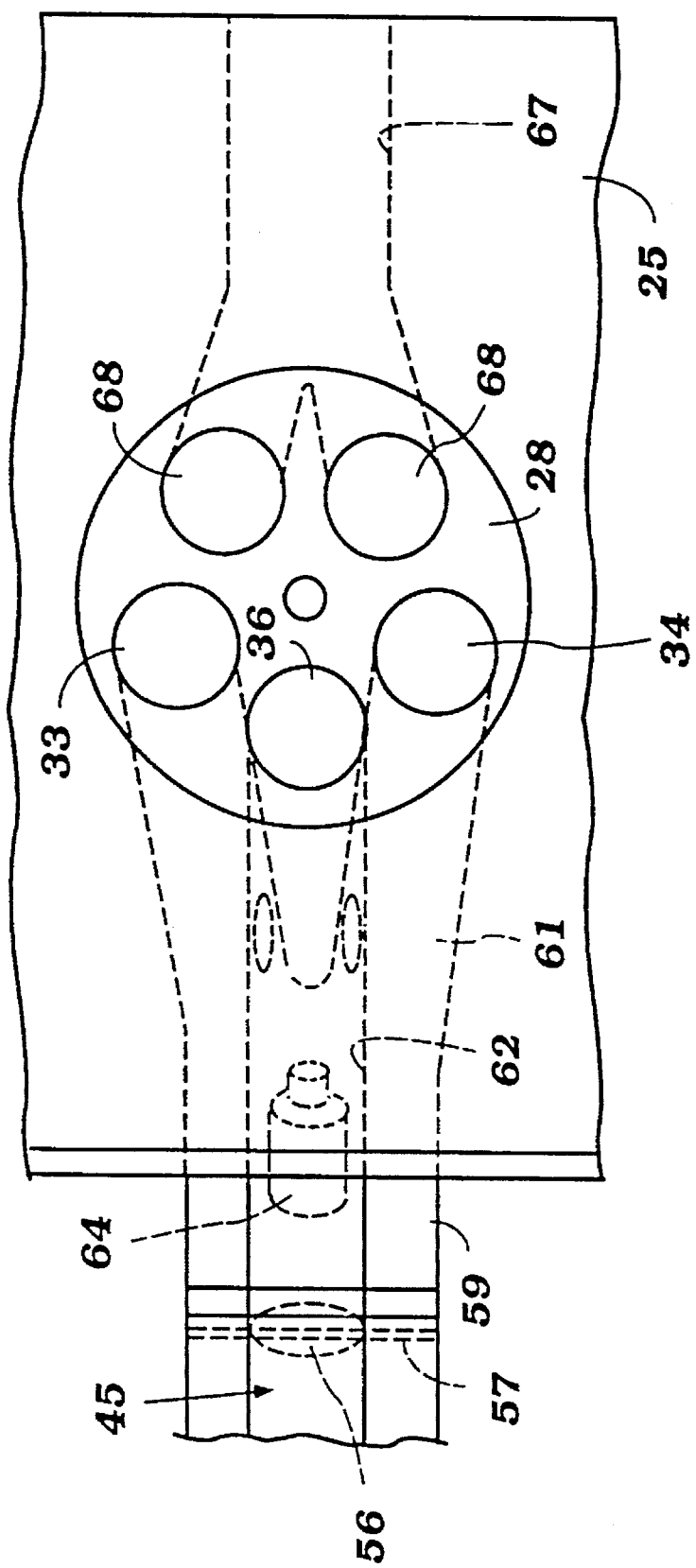
FIG. 11 is a view, in part similar to FIG. 2, looking in the direction of the arrow 11—11 of FIG. 10 and showing this embodiment of the invention.

In the embodiment of the invention as thus far described, the intake passage that serves the center intake valve seat 32 was completely isolated from the intake passages which serve the side intake valve seats 29 and 31. It has been found that under some running conditions and with some engines, this arrangement may provide a dip or fall off in torque under mid-range conditions at the transition point when the control valve 56 is moved from its closed to its open position. FIGS. 10 and 11 show another embodiment which is the same as the embodiment of FIGS. 1–9 except for the distinctions which will now be described. Because of the similarity in construction, components which are the same as those previously described have been identified by the same reference numerals and will not be described again. In this embodiment, however, there are provided a pair of relatively restricted openings 101 in the wall 63 for communicating the center intake passage 62 with the siamese side intake passage 61. This arrangement improves mid-range torque as aforenoted by permitting some cross flow.

It should be readily apparent from the foregoing description that the described construction provides a very effective compact and high performance cylinder head and induction system for an internal combustion engine that provides good performance throughout the entire engine speed at lower ranges. Of course, the foregoing description is that of preferred embodiments of the invention and various changes or modifications may be made without departing from the spirit and scope of the invention as defined by the appended claims.

I claim:

1. A cylinder head and induction passage arrangement for a multi-valve, internal combustion engine comprised of a cylinder head having a surface facing an associated cylinder bore and forming therewith at least in part a combustion chamber, a pair of side valve seats formed in said surface in proximity to the periphery of said cylinder bore and on opposite sides of a first plane containing the axis of the cylinder bore and substantially on one side of a second plane perpendicular to said first plane and containing said cylinder bore axis, and a center intake valve seat intersected by said first plane, spaced from said second plane and in proximity to the periphery of said cylinder bore, induction passage means for supplying a charge to said valve seats, and throttle means for controlling the flow through said induction passage means so that said center valve seat serves the combustion chamber only at high speed, high load conditions.

2. The cylinder head and induction passage arrangement for a multi-valve, internal combustion engine as defined by claim 1, wherein the induction passage means comprises a pair of side intake passages serving the side valve seats and a center intake passage serving the center valve seat.

3. The cylinder head and induction passage arrangement for a multi-valve, internal combustion engine as defined by claim 2, wherein the pair of side intake passages have at least a common selection portion.

4. The cylinder head and induction passage arrangement for a multi-valve, internal combustion engine as defined by claim 3, further including fuel injection means for injecting fuel into the induction passage means.

5. The cylinder head and induction passage arrangement for a multi-valve, internal combustion engine as defined by claim 4, wherein the fuel injection means injects fuel into the common portion of the pair of side intake passages.

6. The cylinder head and induction passage arrangement for a multi-valve, internal combustion engine as defined by claim 2, wherein the center intake passage is substantially shorter in length than the pair of side intake passages.

7. The cylinder head and induction passage arrangement for a multi-valve, internal combustion engine as defined by claim 2, wherein the induction passage means comprises a pair of side intake passages each terminating at a respective one of said side valve seats for delivering a charge to the combustion chamber and a third center intake passage terminating at the center valve seat for delivering a charge to the combustion chamber, at least a portion of said pair of side intake passages extending along the opposite sides of and spaced outwardly of said center intake passage and extending transversely across said center intake passage.

8. The cylinder head and induction passage arrangement for a multi-valve, internal combustion engine as defined by claim 7, wherein the pair of side intake passages have at least a common section portion.

9. The cylinder head and induction passage arrangement for a multi-valve, internal combustion engine as defined by claim 8, further including fuel injection means for injecting fuel into the induction passage means.

10. The cylinder head and induction passage arrangement for a multi-valve, internal combustion engine as defined by claim 9, wherein the fuel injection means injects fuel into the common portion of the pair of side intake passages.

11. The cylinder head and induction passage arrangement for a multi-valve, internal combustion engine as defined by claim 2, wherein the intake passage means comprises three intake passages formed at least in part in the cylinder head each terminating at a respective one of the valve seats for supplying an intake charge to the combustion chamber through the valve seats, the intake passages serving said side valve seats being configured to introduce the charge into the combustion chamber in a direction toward the other side of the second plane for generating a tumble action in said combustion chamber, the intake passage communicating with said center valve seat being configured to deliver a charge into said combustion chamber in a direction generally parallel to the axis of said cylinder bore.

12. The cylinder head and induction passage arrangement for a multi-valve, internal combustion engine as defined by claim 11, wherein the intake passages serving the side valve seats pass at least in part along opposite sides of the intake passage serving the center valve seat and extend transversely across said intake passage serving said center valve seat.

13. The cylinder head and induction passage arrangement for a multi-valve, internal combustion engine as defined by claim 2, wherein one of the intake passages is separated from the remaining intake passages by a wall extending through the cylinder head, and further including opening means formed in said wall and forming the sole communication between said one intake passage and the remaining intake passages.

14. The cylinder head and induction passage arrangement for a multi-valve, internal combustion engine as defined by claim 13, wherein the remaining intake passages communicate with each other through a common section.

15. The cylinder head and induction passage arrangement for a multi-valve, internal combustion engine as defined by claim 14, wherein the opening means is formed in the portion of the wall surrounding the common section.

16. A cylinder head and induction passage arrangement for a multi-valve, internal combustion engine comprised of a cylinder head having a surface facing an associated cylinder bore and forming therewith at least in part a combustion chamber, a pair of side valve seats formed at least in part in said surface in proximity to the periphery of said cylinder bore and on opposite sides of a first plane containing the axis of the cylinder bore and substantially on one side of a second plane perpendicular to said first plane and containing said cylinder bore axis, and a center intake valve seat intersected by said first plane, spaced from said second plane and in proximity to the periphery of said cylinder bore, and three intake passages formed in said cylinder head each terminating at a respective one of said valve seats for supplying an intake charge to said combustion chamber through said valve seats, the intake passages serving said side valve seats being configured to introduce the charge in a direction toward the other side of said second plane for generating a tumble action in said combustion chamber, the intake passage communicating with said center valve seat being configured to deliver a charge into said combustion chamber in a direction generally parallel to said cylinder bore axis.

17. The cylinder head and induction passage arrangement for a multi-valve, internal combustion engine as defined by claim 16, further including control valve means for controlling the respective flow through the intake passages.

18. The cylinder head and induction passage arrangement for a multi-valve, internal combustion engine as defined by claim 17, wherein the control valve means comprises a manually positioned throttle valve in a common portion of the intake passages for controlling the flow through all of the intake passages and a control valve in the intake passage serving the center valve seat that is opened in response to an engine condition.

19. The cylinder head and induction passage arrangement for a multi-valve, internal combustion engine as defined by claim 18, wherein the engine condition comprises speed and load and the control valve is maintained in a closed position under all running conditions except for high speed and high load.

20. The cylinder head and induction passage arrangement for a multi-valve, internal combustion engine as defined by claim 19, wherein the intake passages serving the side valve seats communicate with the intake passage serving the center valve seat through a restricted passageway.

21. The cylinder head and induction passage arrangement for a multi-valve, internal combustion engine as defined by claim 20, wherein the intake passages serving the side valve seats have a common portion separated from the intake passage serving the center valve seat by a common wall and wherein the means for communicating the intake passages comprise restricted openings in the common wall.

22. The cylinder head and induction passage arrangement for a multi-valve, internal combustion engine as defined by claim 16, wherein at least a portion of the intake passages serving the side valve seats extend along opposite sides and spaced outwardly from the intake passage serving the third valve seat and extend transversely across said intake passage serving said center valve seat.

23. The cylinder head and induction passage arrangement for a multi-valve, internal combustion engine as defined by claim 16, wherein at least one of the intake passages is separated from the remaining intake passages by a wall extending through the cylinder head and further including opening means formed in said wall and forming the sole communication between said one intake passage and the remaining intake passages.

24. A cylinder head and induction passage arrangement for a multi-valve, internal combustion engine comprised of a cylinder head having a surface facing an associated cylinder bore and forming therewith at least in part a combustion chamber, a pair of side valve seats formed in said surface in proximity to the periphery of said cylinder bore and on opposite sides of a first plane containing the axis of the cylinder bore and substantially on one side of a second plane perpendicular to said first plane and containing said cylinder bore axis, and a center intake valve seat intersected by said first plane, spaced from said second plane and in proximity to the periphery of said cylinder bore, a plenum chamber for receiving atmospheric air, a pair of first intake passages extending from said plenum chamber in an initial direction away from said side valve seats and then turning toward and each terminating at a respective one of said side valve seats for delivering a charge from said plenum chamber to said combustion chamber, and a third intake passage extending from said plenum chamber generally toward and terminating at said center valve seat for delivering a charge to said combustion chamber, at least a portion of said pair of first intake passages extending along the opposite sides of and spaced outwardly of said third intake passage and extending transversely across said third intake passage.

25. The cylinder head and induction passage arrangement for a multi-valve, internal combustion engine as defined by claim 24, wherein the third intake passage is substantially shorter than the pair of first intake passages.

26. The cylinder head and induction passage arrangement for a multi-valve, internal combustion engine as defined by claim 25, further including control valve means for controlling the respective flow through the intake passages.

27. The cylinder head and induction passage arrangement for a multi-valve, internal combustion engine as defined by claim 26, wherein the control valve means comprises a manually positioned throttle valve in a common portion of the intake passages for controlling the flow through all of the intake passages and a control valve in the third intake passage serving the center valve seat that is opened in response to an engine condition.

28. The cylinder head and induction passage arrangement for a multi-valve, internal combustion engine as defined by claim 27, wherein the engine condition comprises speed and load and the control valve is maintained in a closed position under all running conditions except for high speed and high load.

29. The cylinder head and induction passage arrangement for a multi-valve, internal combustion engine as defined by claim 28, wherein the intake passages communicate with each other at a position downstream of the control valve.

30. A cylinder head and induction passage arrangement for a multi-valve, internal combustion engine comprised of a cylinder head having a surface facing an associated cylinder bore and forming therewith at least in part a combustion chamber, a pair of side valve seats formed in said surface in proximity to the periphery of said cylinder bore and on opposite sides of a first plane containing the axis of the cylinder bore and substantially on one side of a second plane perpendicular to said first plane and containing said cylinder bore axis, and a center intake valve seat intersected by said first plane, spaced from said second plane and in proximity to the periphery of said cylinder bore, three intake passages each extending through said cylinder head from an inlet opening formed in an outer surface and terminating at a respective one of said valve seats, one of said intake passages being separated from the remaining of said intake passages by a wall extending through said cylinder head, and opening means formed in said wall forming the sole communication between said one intake passage and the remaining intake passages.

31. The cylinder head and induction passage arrangement for a multi-valve, internal combustion engine as defined by claim 30, wherein the remaining intake passages have a common portion defined in part by the wall and the opening means is formed in the portion of the wall extending along the common opening.

32. The cylinder head and induction passage arrangement for a multi-valve, internal combustion engine as defined by claim 31, wherein the opening means comprises a pair of openings.

* * * * *